United States Patent
Srinivasan et al.

(10) Patent No.: US 9,685,184 B1
(45) Date of Patent: Jun. 20, 2017

(54) NIFEX-BASED SEED LAYER FOR MAGNETIC RECORDING MEDIA

(71) Applicant: WD Media, LLC, San Jose, CA (US)

(72) Inventors: Kumar Srinivasan, San Mateo, CA (US); Tuqiang Li, San Jose, CA (US); Mrugesh Desai, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 52 days.

(21) Appl. No.: 14/497,299

(22) Filed: Sep. 25, 2014

(51) Int. Cl.
*G11B 5/66* (2006.01)
*G11B 5/667* (2006.01)
*G11B 5/64* (2006.01)
*G11B 5/65* (2006.01)
*G11B 5/84* (2006.01)

(52) U.S. Cl.
CPC ........... *G11B 5/667* (2013.01); *G11B 5/647* (2013.01); *G11B 5/653* (2013.01); *G11B 5/84* (2013.01)

(58) Field of Classification Search
CPC ........... G11B 5/66; G11B 5/667; G11B 5/647; G11B 5/653; G11B 5/84
USPC ............................................. 428/831, 831.2
See application file for complete search history.

(56) References Cited

U.S. PATENT DOCUMENTS

| | | |
|---|---|---|
| 5,034,286 A | 7/1991 | Nasu et al. |
| 5,326,637 A | 7/1994 | Nasu et al. |
| 5,392,290 A | 2/1995 | Brown et al. |
| 5,603,766 A | 2/1997 | Visokay et al. |
| 5,820,963 A | 10/1998 | Lu et al. |
| 5,824,409 A | 10/1998 | Sellmyer et al. |
| 5,840,394 A | 11/1998 | Ranjan et al. |
| 6,007,623 A | 12/1999 | Thiele et al. |
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,086,974 A | 7/2000 | Thiele et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,139,907 A | 10/2000 | Sellmyer et al. |
| 6,143,375 A | 11/2000 | Ross et al. |
| 6,145,849 A | 11/2000 | Bae et al. |

(Continued)

FOREIGN PATENT DOCUMENTS

| | | |
|---|---|---|
| JP | 2005353256 A | 12/2005 |
| JP | 2007-073136 | * 3/2007 |

(Continued)

OTHER PUBLICATIONS

English Machine Translation of JP 2007-073136, Mar. 2007, Japan, pp. 1-22.*

(Continued)

*Primary Examiner* — Holly Rickman
(74) *Attorney, Agent, or Firm* — John D. Henkhaus

(57) ABSTRACT

A recording medium having improved signal-to-noise ratio (SNR) capabilities includes a NiFeX-based magnetic seed layer over a soft magnetic underlayer, where X comprises an element that is soluble in and has a higher melting point than Ni. X may be selected from a group of elements, including ruthenium (Ru), which may facilitate growth of smaller grains and distributions in the corresponding magnetic recording layer(s).

17 Claims, 4 Drawing Sheets

(56) References Cited

U.S. PATENT DOCUMENTS

| | | | |
|---|---|---|---|
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,183,606 B1 | 2/2001 | Kuo et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,406,600 B1 | 6/2002 | Takashima |
| 6,408,677 B1 | 6/2002 | Suzuki |
| 6,410,133 B1 | 6/2002 | Kirino et al. |
| 6,426,157 B1 | 7/2002 | Hokkyo et al. |
| 6,429,984 B1 | 8/2002 | Alex |
| 6,468,670 B1 | 10/2002 | Ikeda et al. |
| 6,472,047 B1 | 10/2002 | Kirino et al. |
| 6,482,330 B1 | 11/2002 | Bajorek |
| 6,482,505 B1 | 11/2002 | Bertero et al. |
| 6,495,252 B1 | 12/2002 | Richter et al. |
| 6,500,567 B1 | 12/2002 | Bertero et al. |
| 6,528,124 B1 | 3/2003 | Nguyen |
| 6,534,206 B1 | 3/2003 | Kirino et al. |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,599,646 B2 | 7/2003 | Suzuki et al. |
| 6,602,620 B1 | 8/2003 | Kikitsu et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,716,516 B2 | 4/2004 | Futamoto et al. |
| 6,730,420 B1 | 5/2004 | Bertero et al. |
| 6,730,421 B1 | 5/2004 | Kirino et al. |
| 6,743,528 B2 | 6/2004 | Suekane et al. |
| 6,749,955 B2 | 6/2004 | Kirino et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,797,137 B2 | 9/2004 | Sandlin et al. |
| 6,811,890 B1 | 11/2004 | Zhou et al. |
| 6,824,817 B2 | 11/2004 | Araki et al. |
| 6,830,824 B2 | 12/2004 | Kikitsu et al. |
| 6,834,026 B2 | 12/2004 | Fullerton et al. |
| 6,846,583 B2 | 1/2005 | Inaba et al. |
| 6,855,232 B2 | 2/2005 | Jairson et al. |
| 6,857,937 B2 | 2/2005 | Bajorek |
| 6,866,948 B2 | 3/2005 | Koda et al. |
| 6,881,495 B2 | 4/2005 | Kikitsu et al. |
| 6,881,496 B2 | 4/2005 | Okamoto |
| 6,881,497 B2 | 4/2005 | Coffey et al. |
| 6,881,503 B2 | 4/2005 | Lu et al. |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,033,686 B2 | 4/2006 | Hirayama et al. |
| 7,045,215 B2 | 5/2006 | Shimokawa |
| 7,070,870 B2 | 7/2006 | Bertero et al. |
| 7,081,309 B2 | 7/2006 | Do et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,141,316 B2 | 11/2006 | Iwasaki et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,195,827 B2 | 3/2007 | Maeda et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,226,674 B2 | 6/2007 | Koda et al. |
| 7,229,266 B2 | 6/2007 | Harper |
| 7,229,588 B2 | 6/2007 | Sandlin et al. |
| 7,239,970 B2 | 7/2007 | Treves et al. |
| 7,241,517 B2 | 7/2007 | Acharya et al. |
| 7,241,520 B2 | 7/2007 | Shin et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,282,278 B1 | 10/2007 | Nolan |
| 7,286,324 B2 | 10/2007 | Yasui et al. |
| 7,289,298 B2 | 10/2007 | Maeda et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| RE40,100 E | 2/2008 | Zhang |
| 7,329,114 B2 | 2/2008 | Harper et al. |
| 7,375,362 B2 | 5/2008 | Treves et al. |
| 7,384,699 B2 | 6/2008 | Nolan et al. |
| 7,420,886 B2 | 9/2008 | Tomiyasu et al. |
| 7,425,377 B2 | 9/2008 | Fullerton et al. |
| 7,425,719 B2 | 9/2008 | Treves et al. |
| 7,435,489 B2 | 10/2008 | Umeda et al. |
| 7,471,484 B2 | 12/2008 | Wachenschwanz et al. |
| 7,482,071 B2 | 1/2009 | Do et al. |
| 7,488,545 B2 | 2/2009 | Fullerton et al. |
| 7,498,062 B2 | 3/2009 | Calcaterra et al. |
| 7,498,092 B2 | 3/2009 | Berger et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,550,210 B2 | 6/2009 | Berger et al. |
| 7,556,870 B2 | 7/2009 | Do et al. |
| 7,569,490 B2 | 8/2009 | Staud |
| 7,572,526 B2 | 8/2009 | Berger et al. |
| 7,582,368 B2 | 9/2009 | Berger et al. |
| 7,597,792 B2 | 10/2009 | Homola et al. |
| 7,597,973 B2 | 10/2009 | Ishiyama |
| 7,608,193 B2 | 10/2009 | Wachenschwanz et al. |

(56) References Cited

U.S. PATENT DOCUMENTS

| | | | |
|---|---|---|---|
| 7,625,643 B2 | 12/2009 | Umeda et al. |
| 7,632,087 B2 | 12/2009 | Homola |
| 7,638,210 B2 | 12/2009 | Berger et al. |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,687,157 B2 | 3/2010 | Berger et al. |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,736,769 B2 | 6/2010 | Ajan |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,846,563 B2 | 12/2010 | Berger et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,989,096 B2 | 8/2011 | Berger et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,000,060 B2 | 8/2011 | Zhang et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,089,829 B2 | 1/2012 | Akagi et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,241,766 B2 | 8/2012 | Lu et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,329,321 B2 | 12/2012 | Takenoiri et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,390,956 B2 | 3/2013 | Tonooka et al. |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,060 B1 | 11/2013 | Tamai et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,685,547 B2 | 4/2014 | Bian et al. |
| 8,696,404 B2 | 4/2014 | Sun et al. |
| 8,696,874 B2 | 4/2014 | Wang et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0041980 A1 | 4/2002 | Suzuki et al. |
| 2002/0060883 A1 | 5/2002 | Suzuki |
| 2002/0110707 A1 | 8/2002 | Kirino et al. |
| 2003/0022024 A1 | 1/2003 | Wachenschwanz |
| 2003/0054202 A1 | 3/2003 | Arisaka et al. |
| 2003/0108721 A1 | 6/2003 | Fullerton et al. |
| 2003/0134154 A1 | 7/2003 | Kirino et al. |
| 2003/0162041 A1 | 8/2003 | Nemoto et al. |
| 2004/0013910 A1 | 1/2004 | Acharya et al. |
| 2004/0022387 A1 | 2/2004 | Weikle |
| 2004/0047758 A1 | 3/2004 | Olson et al. |
| 2004/0110035 A1 | 6/2004 | Shin et al. |
| 2004/0132301 A1 | 7/2004 | Harper et al. |
| 2004/0166376 A1 | 8/2004 | Kirino et al. |
| 2004/0185307 A1 | 9/2004 | Oikawa et al. |
| 2004/0191578 A1 | 9/2004 | Chen et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |

(56) References Cited

U.S. PATENT DOCUMENTS

| | | |
|---|---|---|
| 2005/0036223 A1 | 2/2005 | Wachenschwanz et al. |
| 2005/0100764 A1 | 5/2005 | Ranjan et al. |
| 2005/0106422 A1 | 5/2005 | Lu et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0202286 A1 | 9/2005 | Chen et al. |
| 2005/0214520 A1 | 9/2005 | Oikawa et al. |
| 2005/0214588 A1 | 9/2005 | Iwasaki et al. |
| 2005/0227120 A1 | 10/2005 | Ichihara et al. |
| 2005/0233174 A1 | 10/2005 | Munteanu et al. |
| 2005/0255336 A1 | 11/2005 | Mukai |
| 2005/0263401 A1 | 12/2005 | Olsen et al. |
| 2006/0024432 A1 | 2/2006 | Nolan et al. |
| 2006/0090998 A1 | 5/2006 | Honda et al. |
| 2006/0147758 A1 | 7/2006 | Jung et al. |
| 2006/0166039 A1 | 7/2006 | Berger et al. |
| 2006/0177704 A1 | 8/2006 | Berger et al. |
| 2006/0181697 A1 | 8/2006 | Treves et al. |
| 2006/0188743 A1 | 8/2006 | Seki et al. |
| 2006/0199044 A1 | 9/2006 | Thangaraj et al. |
| 2006/0204791 A1 | 9/2006 | Sakawaki et al. |
| 2006/0207890 A1 | 9/2006 | Staud |
| 2006/0222902 A1 | 10/2006 | Mukai |
| 2006/0286414 A1 | 12/2006 | Racine et al. |
| 2006/0289294 A1 | 12/2006 | Racine et al. |
| 2007/0009654 A1 | 1/2007 | Watanabe et al. |
| 2007/0026262 A1 | 2/2007 | Maeda |
| 2007/0031705 A1 | 2/2007 | Hattori et al. |
| 2007/0070549 A1 | 3/2007 | Suzuki et al. |
| 2007/0072011 A1 | 3/2007 | Li et al. |
| 2007/0172706 A1 | 7/2007 | Chen |
| 2007/0189916 A1 | 8/2007 | Zhang |
| 2007/0231609 A1 | 10/2007 | Ajan et al. |
| 2007/0243418 A1 | 10/2007 | Fullerton et al. |
| 2007/0245909 A1 | 10/2007 | Homola |
| 2007/0292720 A1 | 12/2007 | Suess |
| 2008/0075845 A1 | 3/2008 | Sonobe et al. |
| 2008/0093760 A1 | 4/2008 | Harper et al. |
| 2008/0131735 A1 | 6/2008 | Das et al. |
| 2008/0144213 A1 | 6/2008 | Berger et al. |
| 2008/0180843 A1 | 7/2008 | Zhang et al. |
| 2008/0198512 A1 | 8/2008 | Mukai |
| 2008/0206601 A1 | 8/2008 | Mukai |
| 2008/0292907 A1 | 11/2008 | Berger et al. |
| 2008/0299416 A1 | 12/2008 | Yoon et al. |
| 2008/0311430 A1 | 12/2008 | Chen et al. |
| 2009/0110961 A1 | 4/2009 | Shibata et al. |
| 2009/0117408 A1 | 5/2009 | Umezawa et al. |
| 2009/0130346 A1 | 5/2009 | Osawa et al. |
| 2009/0135527 A1 | 5/2009 | Lee et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0257147 A1 | 10/2009 | Ajan |
| 2009/0290256 A1 | 11/2009 | Berger et al. |
| 2009/0292720 A1 | 11/2009 | De Peuter et al. |
| 2009/0296278 A1 | 12/2009 | Inamura et al. |
| 2009/0311557 A1 | 12/2009 | Onoue et al. |
| 2010/0062286 A1 | 3/2010 | Suess |
| 2010/0128391 A1 | 5/2010 | Berger et al. |
| 2010/0140727 A1 | 6/2010 | Shimatsu et al. |
| 2010/0143752 A1 | 6/2010 | Ishibashi et al. |
| 2010/0149676 A1 | 6/2010 | Khizorev et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0209737 A1 | 8/2010 | Bian et al. |
| 2010/0215992 A1 | 8/2010 | Horikawa et al. |
| 2010/0232065 A1 | 9/2010 | Suzuki et al. |
| 2010/0247960 A1 | 9/2010 | Qiu et al. |
| 2010/0247962 A1 | 9/2010 | Sasaki |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0003175 A1 | 1/2011 | Valcu et al. |
| 2011/0097603 A1 | 4/2011 | Onoue |
| 2011/0097604 A1 | 4/2011 | Onoue |
| 2011/0122525 A1 | 5/2011 | Nemoto et al. |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0026626 A1 | 2/2012 | Nolan et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0219827 A1 | 8/2012 | Kim et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |
| 2014/0300994 A1 | 10/2014 | Hong et al. |

FOREIGN PATENT DOCUMENTS

| | | | |
|---|---|---|---|
| WO | 2008030199 A1 | | 3/2008 |
| WO | 2009044794 A1 | | 4/2009 |
| WO | 2010038448 A1 | | 8/2010 |
| WO | WO2012070464 | * | 5/2012 |

OTHER PUBLICATIONS

English machine translation of Japanese Publication No. 08-030951, Japan, Feb. 2, 1996, 8 pages.

Ariake, J., et al., "Co—Pt—TiO2 Composite Film for Perpendicular Magnetic Recording Medium," IEEE Transactions on Magnetics, vol. 41 (10), Oct. 2005. pp. 3142-3144.

Arnett, P.C., et al.,"TMR and Squeeze at Gigabit Areal Densities," IEEE Transactions on Magnetics, vol. 28 (4), Jul. 1992, pp. 1-4.

Berger, A., et al., "Improved media performance in optimally coupled exchange spring layer media," Applied Physics Letters, vol. 93 (122502), Sep. 22, 2008, pp. 1-3.

(56) References Cited

OTHER PUBLICATIONS

Chen, J.S., et al., "High Coercivity L 10 FePt Films with Perpendicular Anistropy Deposited on Glass Substrate at Reduced Temperature," Applied Physics Letters 90 (042508), Jan. 25, 2007, pp. 1-3.

Choe, G., et al., "Magnetic and Recording Characteristics of Reactively Sputtered CoPtCr—(Si—O, Ti—O, and Cr—O) Perpendicular Media," IEEE Transactions on Magnetics, vol. 42 (10), Oct. 2006, pp. 2327-2329.

Choe, G., et al., "Control of Exchange Coupling Between Granular Oxide and Highly Exchange Coupled Cap Layers and the Effect on Perpendicular Magnetic Switching and Recording Characteristics," IEEE Transactions on Magnetics, vol. 45 (6), Jun. 2009, pp. 2694-2700.

Choe, G., et al., "Writeability Enhancement in Perpendicular Magnetic Multilayered Oxide Media for High Area Density Recording," IEEE Transactions on Magnetics, vol. 47 (1), Jan. 2011, pp. 55-62.

Hashimoto, A.,, et al., "Improvement of Magnetic Properties of Granular Perpendicular Recording Media by Using a FCC Nonmagnetic Intermediate Layer With Stacking Faults," Applied Physics Letters, vol. 89 (262508), Dec. 28, 2006, pp. 1-3.

Hashimoto, A., et al., "Pseudo-HCP Nonmagnetic Intermediate Layer for Granular Media with High Perpendicular Magnetic Anisotropy," Journal of Physics D: Applied Physics, vol. 41 (012002), 2008, pp. 1-4.

Hu, J.F., et al., "Exchange Coupling Assisted FePtC Perpendicular Recording Media," Applied Physics Letters 93 (072504), Aug. 19, 2008, pp. 1-3.

Jung, H.S., et al., "Effect of Oxygen Incorporation on Microstructure and Media Performance in CoCrPt—SiO2 Perpendicular Recording Media," IEEE Transactions on Magnetics, vol. 43 (2), Feb. 2007, pp. 615-620.

Jung, H.S., et al., "CoCrPtO-Based Granular Composite Perpendicular Recording Media," IEEE Transactions on Magnetics, vol. 43 (6), Jun. 2007, pp. 2088-2090.

Jung, H.S., et al., "Origin of Incoherent Magnetic Switching Behavior in CoCrPt—SiO2 Perpendicular Magnetic Recording Media," Applied Physics Letters, vol. 91 (212502), Jul. 2007, pp. 1-3.

Jung, H.S., et al., "Effect of magnetic softness in a soft layer on media properties of hard/soft stacked composite perpendicular media," Journal of Applied Physics 105 (07B740), Apr. 9, 2009, pp. 1-3.

Kirby, B.J., et al., "Vertically Graded Anistropy in Co/Pd Multilayers," Physics Department, University of California, Davis, CA, pp. 1-16.

Kwon, U., et al., "Ru/Ru-Oxide Interlayers for CoCrPtO Perpendicular Recording Media,"IEEE Transactions on Magnetics, vol. 41 (10), Oct. 2005, pp. 3193-3195.

MSE 201, Introduction to Materials Science, Diffusion, Callister, Ch. 5, University of Tennessee, Dept. of Materials Science and Engineering, pp. 1-26.

Nakagawa, H., et al., "Effects of thin carbon intermediate layer on magnetic and structural properties of perpendicular recording media," Journal of Magnetism and Magnetic Materials, 235, 2001, pp. 73-77.

Nolan, T., et al., "Microstructure and Exchange Coupling of Segregated Oxide Perpendicular Recording Media," IEEE Transactions on Magnetics, vol. 43 (2), Feb. 2007, pp. 639-644.

Nolan, T., et al., "Effect of Composite Designs on Writability and Thermal Stability of Perpendicular Recording Media," IEEE Trans. on Magnetics, vol. 47 (1), Jan. 2011, pp. 63-68.

Park, S.H., et al., "Effect of MgO and Al2O3 on the Microstructure and Magnetic Properties of CoCrPt-oxide Perpendicular Recording Media," Journal of Applied Physics, vol. 97 (10), 2005, pp. 106-1-106-3.

Piramanayagam, S.N., et al., "Advanced Perpendicular Recording Media Structure With a Magnetic Intermediate Layer," Applied Physics Letters, vol. 88 (092501), Feb. 27, 2006, pp. 1-3.

Rauch, G.C., et al., "The Effect of Cluster Size on Media Noise in Co—Ni—P Thin Films," IEEE Transactions on Magnetics, vol. 28 (5), Sep. 1992, pp. 3105-3107.

Richter, H.J., "The Physics of Perpendicular Records," Seagate Technology, Fremont, California, Dec. 2006, 22 pp.

Sonobe, Y., et al., "Thermally Stable CGC Perpendicular Recording Media With PT-Rich CoPtCR and Thin PT Layers," IEEE Trans. on Magn., vol. 38 (5), Sep. 2002, pp. 2006-2011.

Suess, D., et al., "Optimization of Exchange Spring Perpendicular Recording Media," IEEE Trans. on Magn., vol. 41 (10), Oct. 2005, pp. 3166-3168.

Suess, D., et al., "Concepts of Magnetic 3D and Multilayer Recording," Vienna University of Technology, Vienna, Austria and The University of Sheffield, Sheffield, UK, pp. 1-34.

Suess, D., et al., "Optimizing Graded Perpendicular Media," University of California, Davis, CA, pp. 1-14.

Victora, R.H., et al., "Composite Media for Perpendicular Magnetic Recording," IEEE Trans. on Magn., vol. 41 (2), Feb. 2005, pp. 537-542.

Victora, R.H., et al., "Exchange Coupled Composite Media," IEEE, Conference-Related Paper, Aug. 15, 2007, pp. 1-9.

Wang, J.P., et al., "Exchange Coupled Composite Media for Perpendiculat Magnetic Recording," IEEE Transactions on Magnetics, vol. 41 (10), Oct. 2005, pp. 3181-3186.

Wierman, K. W., et al., "RuxCr1—x/Ta Underlayer for Co-alloy Perpendicular Magnetic Recording," Journal of Applied Physics, vol. 91 (10), May 15, 2002, pp. 8031-8033.

Yuan, H., et al., "Ru+Oxide Interlayer for Perpendicular Magnetic Recording Media," Journal of Applied Physics, vol. 103 (07F513), Jan. 30, 2008, pp. 1-3.

Zhang, K., et al., "Effects of exchange coupling between cap layer and oxide layer on the recording performance in perpendicular media," Journal of Applied Physics, vol. 105 (07B710), Mar. 9, 2009, pp. 1-3.

Zheng, M., et al., "Role of Oxygen Incorporation in Co—Cr—Pt—Si—O Perpendicular Magnetic Recording Media," IEEE Transactions on Magnetics, vol. 40 (4), Jul. 2004, pp. 2498-2500.

Zhu, J., "Understand PMR Media," Data Storage Systems Center, Carnegie Mellon University, 2009, pp. 1-12.

Mrugesh Desai, et al., U.S. Appl. No. 13/077,419, filed Mar. 31, 2011, 22 pages.

Kumar Srinivasan, et al., U.S. Appl. No. 13/919,282, filed Jun. 17, 2013, 24 pages.

Chengjun Sun, et al., U.S. Appl. No. 12/625,504, filed Nov. 24, 2009, 27 pages.

Johannes van Ek, U.S. Appl. No. 12/978,225, filed Dec. 23, 2010, 19 pages.

Hua Yuan, et al., U.S. Appl. No. 12/850,951, filed Aug. 5, 2010, 19 pages.

Kumar Srinivasan et al., U.S. Appl. No. 14/556,993, filed Dec. 1, 2014, 37 pages.

* cited by examiner

US 9,685,184 B1

NIFEX-BASED SEED LAYER FOR MAGNETIC RECORDING MEDIA

FIELD OF EMBODIMENTS

Embodiments of the invention may relate generally to hard disk drives and more particularly to magnetic recording media.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

In order to improve the recording performance for media, it is desirable to increase the SNR (Signal-to-Noise Ratio) through structure design and materials selections.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a recording medium having a NiFeX-based magnetic seed layer under a magnetic recording layer are described. In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Physical Description of Illustrative Operating Environments

Embodiments may be used in the context of a perpendicular magnetic recording (PMR) medium for a hard-disk drive (HDD) data storage device. Thus, in accordance with an embodiment, a plan view illustrating an HDD 100 is shown in FIG. 1 to illustrate an exemplary operating environment.

Figure 1:
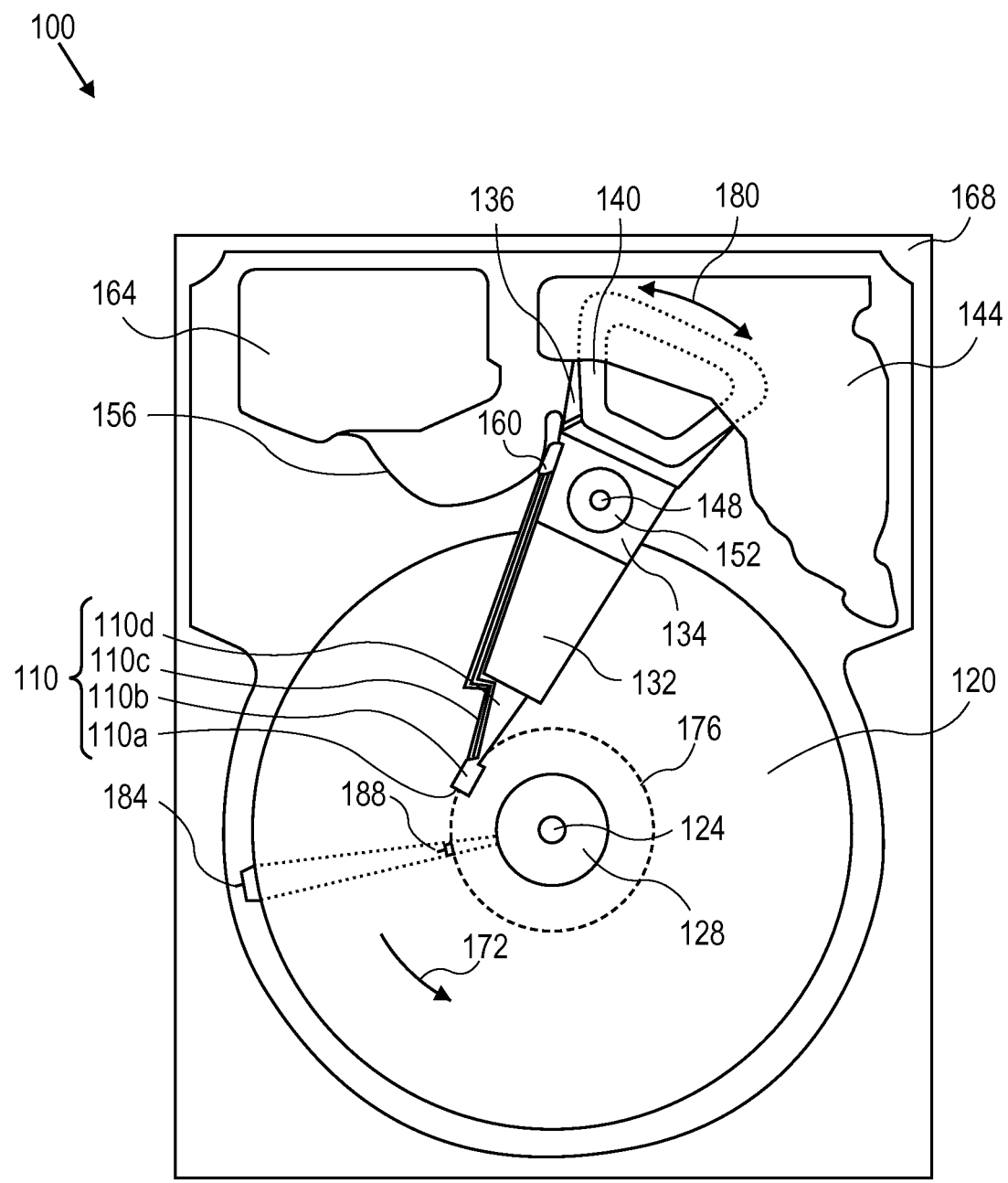
FIG. 1 is a plan view illustrating a hard disk drive, according to an embodiment.

FIG. 1 illustrates the functional arrangement of components of the HDD 100 including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The head 110a includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Introduction

A perpendicular magnetic recording (PMR) system records data as magnetizations oriented perpendicular to the plane of the magnetic recording disk. The magnetic disk has a magnetically soft underlayer covered by a thin magnetically hard top layer. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Perpendicular recording media may comprise a stack of several Co based magnetic layers, which is grown on a Ru intermediate layer or a combination of Ru and Ru—X intermediate layers, a Ni—W or Ni—W—Al or Ni—W—Al—Fe orientation control seed layer, a possible Ta seed layer, and soft magnetic underlayers on a substrate, in that order. If glass substrates are used, Cr or CrTi or CrTa adhesion layers may also be present underneath the soft magnetic underlayers. In the foregoing media design structure, the Ni-based orientation control seed layer, which is poly-crystalline, primarily sets the template for the grain size and its distribution in the Ru based intermediate layer and subsequently, in the Co based magnetic layer. The grains in poly-crystalline thin films grow by means of two events: (i) nucleation of grains at energetically favorable sites on the underlying layer or substrate, and (ii) once nucleated, grain growth is driven by diffusion processes. During thin film sputtering, since both nucleation and grain growth events happen simultaneously, a log-normal grain size distribution results. Nucleation is a thermodynamic process and is typically a random event that can be controlled to some extent by engineering pre-determined nucleation sites on the underlying layer or substrate. Grain growth, however, is a kinematical process and is governed by the mobility of the precipitate (sputtered atoms that have nucleated into grains). The latter process provides the context for embodiments described herein.

Figure 2:
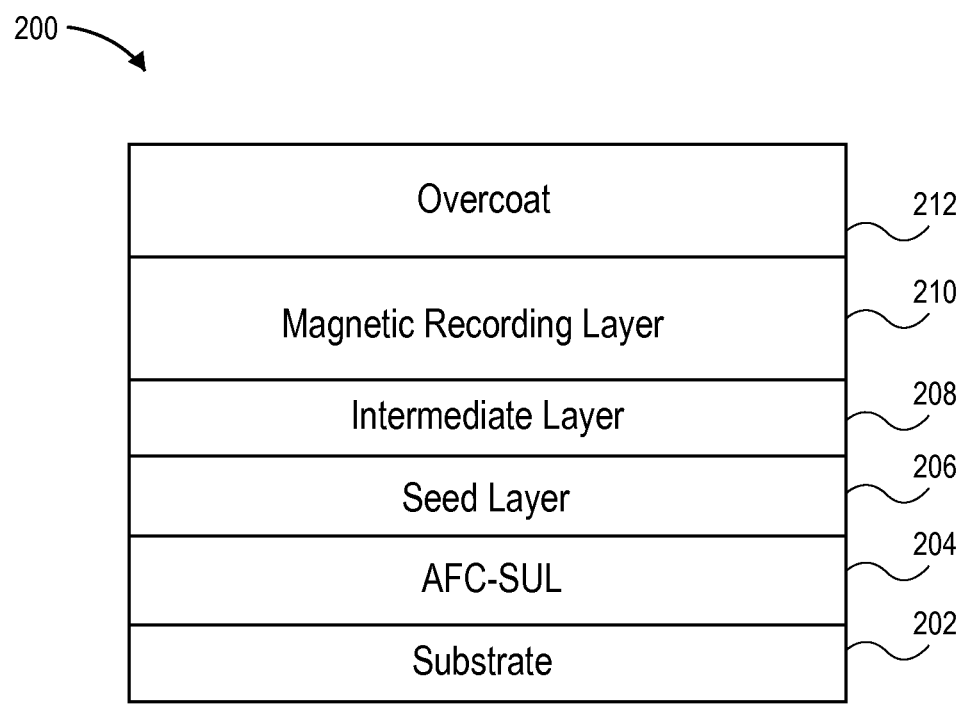
FIG. 2 illustrates a perpendicular magnetic recording (PMR) media stack, according to an embodiment.

FIG. 2 illustrates a perpendicular magnetic recording (PMR) media stack, according to an embodiment. Media stack 202 comprises a substrate 202, over which an antiferromagnetically coupled soft magnetic underlayer (AFC-SUL) 204 laminate is fabricated, over which one or more seed layer 206 is fabricated, over which an intermediate layer 208 is fabricated, over which one or more magnetic recording layer 210 is fabricated, and over which an overcoat is fabricated. Further, and for example, one or more adhesion layer may be fabricated on the substrate 202.

Reference herein to a "layer" is not intended to be thereby limited to a single layer, rather each "layer" referenced may actually comprise multiple layers, or a "stack" of thin film layers. Further, the term "fabricated" may include any of a number of thin film processes, such as chemical and/or physical deposition processes (of which sputtering is commonly used in hard disk media production), which "grow" grains of poly-crystalline thin films, for example, as well as crystalline epitaxial growth, and the like. Therefore, use of the term "fabricated" and related terms are not limited to any particular process, unless otherwise indicated.

For example and according to an embodiment, media stack 200 may comprise a Al—Mg substrate 202 covered by (i) Cr or CrTa or CrTi adhesion layers, (ii) an antiferromagnetically coupled soft magnetic underlayer (AFC-SUL 204) laminate, (iii) a Ta based seed layer and a NiW or NiWAl or NiWAlFe based seed layer (seed layer 206), (iv) a Ru and/or RuCo based intermediate layer (intermediate layer 208), and (v) a stack of several magnetic layers (magnetic recording layer 210), including exchange-control layers (ECLs) or exchange-break layers (EBLs), covered with a carbon overcoat (overcoat 212). Such a media stack may use a exchange-coupled composite (ECC) design, including two exchange-break layers. According to an embodiment, intermediate layer 208 comprises dual Ru intermediate layers, comprising a Ru layer processed at low Ar gas sputter pressure of ~7 mtorr, followed by another Ru layer processed using high Ar gas sputter pressure of ~90 mtorr.

NiX-Based Seed Layer

In order to further increase areal storage densities from current levels, tighter grain sizes and distributions are highly desireable in the Co based magnetic recording layer. This is from the point of view of reducing noise (i.e., improving the signal-to-noise ratio, or SNR) not only by creating more uniform grain morphologies, but also by reducing inter-granular magnetic interactions. One way to achieve tighter grain size distributions in the magnetic recording layer is to improve the grain size distributions in the Ni based seed layer itself, since the latter acts as a template for the former. With that in mind, the grain growth process may be controlled to some extent based on the sputtering of the Ni based seed layer.

As mentioned, the grain growth process is a mobility driven event, thereby determined by the diffusion coefficient of the precipitate, which itself depends inversely on the melting point of the precipitate. Basis for the inverse relationship between the melting point and the diffusion coefficient for an element may be found in, e.g., "Correlations For Diffusion Constants" by A. M. Brown and M. F. Ashby, from Acta Metallurgica, Vol. 28, pp. 1085-1101, the entire contents of which is incorporated by reference in its entirety for all purposes as if fully set forth herein. Section 2.1 of the foregoing paper may be particularly relevant.

In order to control the mobility of the precipitate, it is deemed beneficial to alloy the Ni seed material with elements that are both soluble in Ni and have higher melting points compared to Ni. The precipitates formed by sputtering this alloy seed material can be expected to have higher melting points compared to the original seed, and consequently lower diffusion coefficients.

The diffusion coefficient, or diffusivity, is typically described in the context of a relationship among at least two elements or substances, i.e., one with respect to another, and may be described in units of length/time (e.g., nm²/s). Thus, the lower the diffusivity of one substance with respect to the other, the slower the substances diffuse into each other. Consequently, this could lead to tighter grain size distributions in the seed, and subsequently in the magnetic recording layer, further leading to improved recording performance.

Continuing, the diffusion coefficient is the measure of mobility of diffusing species and, including in solids at different temperatures, is generally found to be well-predicted by Arrhenius plots. The diffusion coefficient may be characterized with the following equation:

$$D = D_0 \exp\{-Q_d/RT\}; \quad (1)$$

where

D is the diffusion coefficient (m²/s);

$D_0$ is the temperature-independent preexponential (m²/s);

$Q_d$ is the activation energy for diffusion (J/mol or eV/atom);

R is the gas constant (8.31 J/mol-K or 8.62×10⁻⁵ eV/atom-K); and

T is the absolute temperature (K).

The above equation (1) can be rewritten as:

$$\ln D = \ln D_0 - (Q_d/R)(1/T); \text{ or} \quad (2)$$

$$\log D = \log D_0 - (Q_d/2.3R)(1/T). \quad (3)$$

The activation energy $Q_d$ and preexponential $D_0$, therefore, can be estimated by plotting ln D versus 1/T or log D versus 1/T, where such plots are aforementioned Arrhenius plots.

According to an embodiment, seed layer 206 comprises a magnetic NiFe-based seed layer. According to an embodiment, seed layer 206 comprises a NiFeX-based seed layer where X comprises an element that is soluble in Ni and has a higher melting point than Ni.

Table 1 presents a list of chemical elements that are soluble in nickel (Ni), up to approximately x at %, and have a higher melting point than nickel.

TABLE 1

| Element X | x Atomic % |
|---|---|
| Ruthenium (Ru) | 0-35 at % |
| Osmium (Os) | 0-10 at % |
| Platinum (Pt) | 0-30 at % |
| Rhenium (Re) | 0-15 at % |
| Rhodium (Rh) | 0-40 at % |
| Technetium (Tc) | 0-30 at % |
| Iridium (Ir) | 0-15 at % |
| Cobalt (Co) | 0-60 at % |

According to an embodiment, seed layer 206 comprises a magnetic $(NiFe)_{100-x}(X)_x$ alloy with X being selected from a group consisting of Ruthenium (Ru), Osmium (Os), Platinum (Pt), Rhenium (Re), Rhodium (Rh), Technetium (Tc), Iridium (Ir), and Cobalt (Co). According to a related embodiment, seed layer 206 comprises a magnetic $(NiFe)_{100-x}(X)_x$ alloy with X being selected from a group consisting of Ruthenium (x=0-35 at %), Osmium (x=0-10 at %), Platinum (x=0-30 at %), Rhenium (x=0-15 at %), Rhodium (x=0-40 at %), Technetium (x=0-30 at %), Iridium (x=0-15 at %), and Cobalt (x=0-60 at %).

For a non-limiting example, seed layer material of the compositions Ni-3W-1Al-30Fe-(x at %)Ru, where x=3 and 6, were evaluated. According to published phase diagrams of the Ni—Ru binary alloy, pure Ni has a melting point (m.p.) of 1455° C., whereas pure Ru has a m.p. of 2334° C., and the solid solubility of Ru in Ni is around 5 at %. The published phase diagram is for a state of thermodynamic equilibrium, however, during sputtering of a single phase NiRu-based thin film alloy, the phases are typically metastable, i.e., not in thermodynamic equilibrium, therefore higher solubility of Ru in Ni is achievable. Therefore, the foregoing "up to approximately x at %" (~x atomic percentage) of the different elements listed in Table 1 are deemed producible using current state-of-the-art sputtering tools and processes by controlling the sputter parameters accordingly, for example, the temperature and pressure. During sputtering, an alloy of Ni & Ru in the limit of solid solubility can be expected to form a precipitate with (i) a higher melting point compared to pure Ni precipitate, and (ii) a secondary phase structure that is insoluble in Ni and forms a grain boundary phase. Both properties of the precipitate can help to control the grain growth and grain segregation processes.

Thus, and according to an embodiment, seed layer 206 comprises a NiFeRu-based seed layer. According to a related embodiment, seed layer 206 comprises a NiFeRu-based seed layer comprising around 1-20 at % Ru. As discussed and as presented in Table 1, a NiFeRu-based alloy having a range up to 35 at % Ru is deemed producible, however, a range considered practical yet effective in a high-volume production environment is approximately 1-20 at % Ru.

As discussed in reference to FIG. 2, one or more seed layer 206 is fabricated over the soft magnetic underlayer (AFC-SUL) 204 laminate. According to an embodiment, the NiFeX-based magnetic seed layer is formed in direct contact with the soft magnetic underlayer.

Magnetic Grain Size, Uniformity, Segregation

To repeat, the grain growth process is a mobility driven event, thereby determined by the diffusion coefficient of the precipitate, which itself depends inversely on the melting point of the precipitate. In order to control the mobility of the precipitate, it is deemed beneficial to alloy the Ni seed material with elements that are both soluble in Ni and have higher melting points compared to Ni, as the precipitates formed by sputtering this alloy seed material (e.g., NiX) can be expected to have higher melting points compared to the original seed (e.g., Ni), and consequently lower diffusion coefficients, as well as a secondary phase structure that is insoluble in Ni and forms a grain boundary phase. These characteristics help to control the grain growth and grain segregation processes, thereby leading to tighter grain size distributions and intra-granular segregation in the seed, and consequently in the magnetic recording layer(s).

Figure 3:
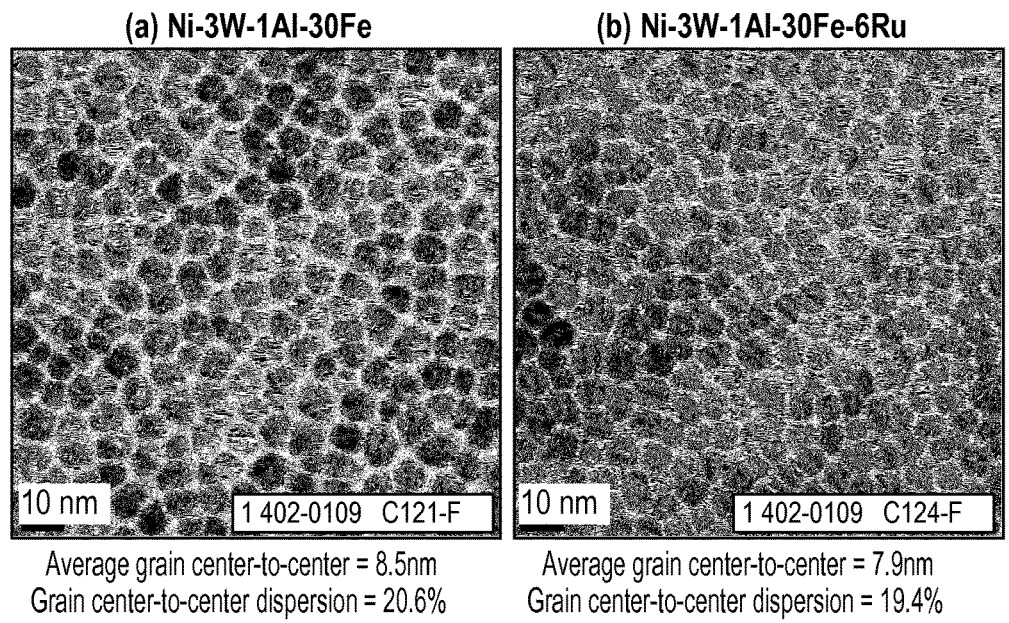
FIG. 3 is a plan view illustrating grains of magnetic recording media, according to an embodiment.

FIG. 3 is a plan view illustrating grains of magnetic recording media, according to an embodiment. FIG. 3 shows plan view images of the grains from magnetic recording medium taken using a Transmission Electron Microscope (TEM), from (a) medium using a Ni-3W-1Al-30Fe seed and (b) from medium using a Ni-3W-1Al-30Fe-6Ru seed, according to an embodiment. The average center-to-center distance between grains in the case of the (a) seed was 8.5±1.7 nm and in the case of the (b) seed the average center-to-center distance between grains was 7.9±1.5 nm. The grain center-to-center dispersion was 20.6% in the case of the (a) seed, and was about 19.4% in the case of the (b) seed. Thus, when the Ni-3W-1Al-30Fe-6Ru seed was introduced, not only did the grain center-to-center distance shrink, but the dispersion also became smaller.

Figure 4:
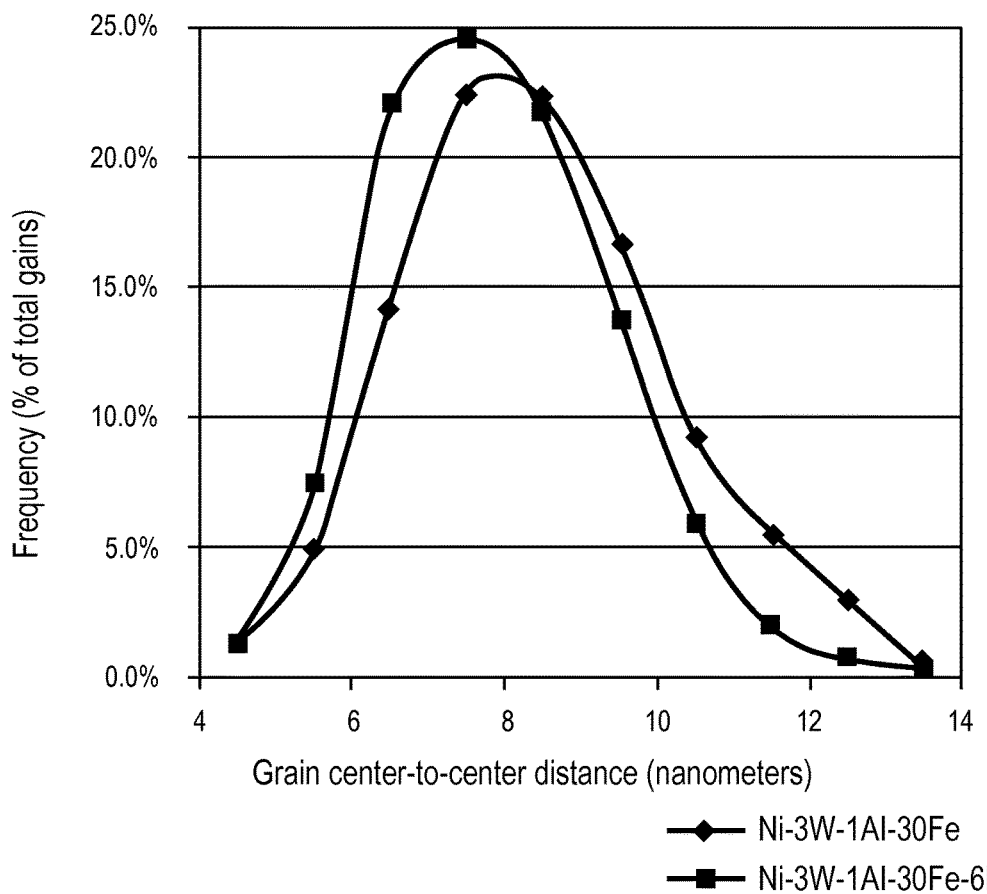
FIG. 4 is a histogram graph illustrating grain center-to-center distribution of magnetic recording media of FIG. 3, according to an embodiment.

FIG. 4 is a histogram graph illustrating grain center-to-center distribution of the magnetic recording media of FIG. 3, according to an embodiment. This histogram points to the conclusion that the medium on the Ni-3W-1Al-30Fe-6Ru seed (image (b) of FIG. 3) has few large grains (e.g., >9 nm in center-to-center distance) compared to the medium on the Ni-3W-1Al-30Fe seed (image (a) of FIG. 3). Resultantly, the average center-to-center distance and the dispersion were both lower for the (b) seed in comparison to the (a) seed, which highlights improvements facilitated by the NiFeRu-based seed material. A practical result illustrated by the lower average center-to-center distance and by the lower grain-to-grain center dispersion of the magnetic grains of the magnetic recording layer (e.g., magnetic recording layer 210 of FIG. 2) is that the magnetic grains are smaller (e.g., as evidenced by a lower average center-to-center distance) and more uniform in size (e.g., as evidenced by a lower grain-to-grain center dispersion) for a magnetic recording layer grown using the NiFeX-based seed material than would a magnetic recording layer grown on a NiFe-based seed layer not comprising the X element.

A comparison of the coercivity and of the demagnetization factor of the magnetic recording media of FIG. 3(a) and FIG. 3(b), for a single magnetic layer configuration, showed that the medium using the Ni-3W-1Al-30Fe-6Ru seed layer (image (b) of FIG. 3) demonstrated lower coercivities over a range of thicknesses, compared to medium using Ni-3W-1Al-30Fe seed layer (image (a) of FIG. 3). Further, for seed layer thicknesses>~4 nm, the demagnetization factor is larger for the medium using the Ni-3W-1Al-30Fe-6Ru seed layer. Therefore, while the coercivities may be lower when using the Ni-3W-1Al-30Fe-6Ru seed layer, the inter-granular exchange coupling interactions are also reduced favorably (i.e., inter-granular segregation improved), which leads to an improvement in SNR performance.

A comparison of the coercivity and of the thermal stability factor of the magnetic recording media of FIG. 3(a) and FIG. 3(b), for a multiple magnetic layer stack (exchange-coupled composite media design), showed that the medium using the Ni-3W-1Al-30Fe-6Ru seed layer (image (b) of FIG. 3) demonstrated lower coercivities and thermal stability factors over a range of thicknesses, compared to medium using Ni-3W-1Al-30Fe seed layer (image (a) of FIG. 3). Therefore, this is an indication that the grains of the magnetic recording layer may be smaller when using the Ni-3W-1Al-30Fe-6Ru seed.

Embodiments described herein may be directed to a PMR media design utilizing a NiFeX-based magnetic seed layer for reduced noise and likewise improved SNR. In various embodiments, the introduction of a suitable seed layer results in a desirable decrease in the magnetic grain size and an increase in grain size uniformity, and more uniform inter-granular segregation, and a corresponding increase in the SNR for the PMR media. However, embodiments are not limited to PMR technology only, as embodiments may be implemented in the context of other types of magnetic recording media.

Method of Manufacturing Recording Media

Figure 5:
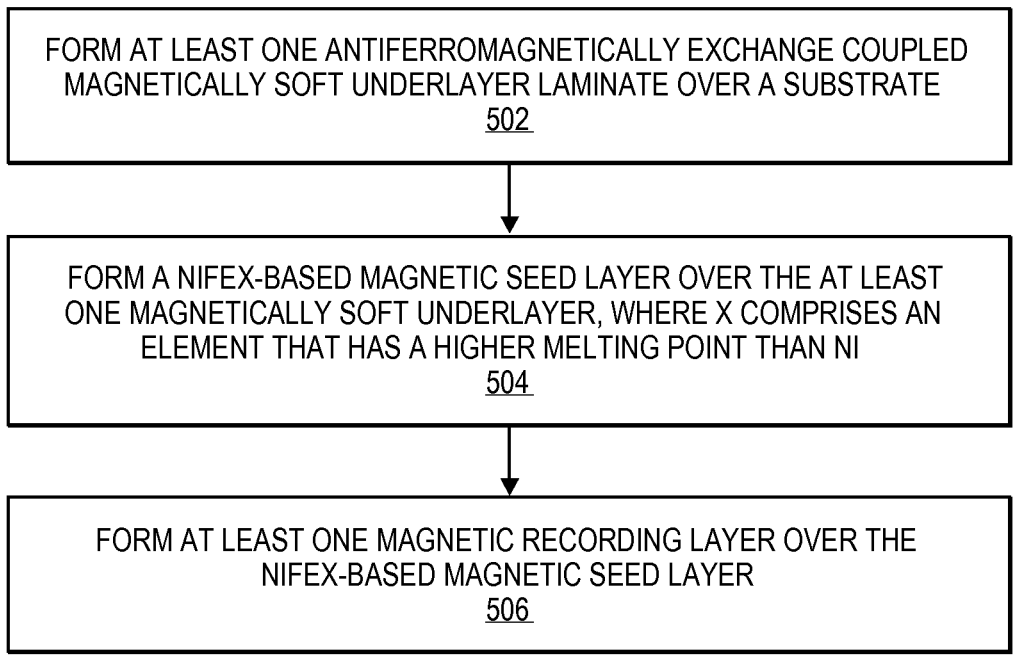
FIG. 5 is a flow diagram illustrating a method of manufacturing a recording medium, according to an embodiment.

FIG. 5 is a flow diagram illustrating a method of manufacturing a recording medium, according to an embodiment. Embodiments may be implemented in a PMR hard disk drive including such PMR media. Fabrication of the media stack described herein may be through implementation of a sputtering process using a sputtering system using a NiX sputtering target for the seed layer, for example.

At block 502, at least one antiferromagnetically exchange coupled magnetically soft underlayer laminate is formed over a substrate. For example, AFC-SUL 204 (FIG. 2) is formed over substrate 202 (FIG. 2).

At block 504, a NiFeX-based magnetic seed layer is formed over the soft underlayer, where X comprises an element having a higher melting point than Ni. For example, a NiFeX-based seed layer 206 (FIG. 2) is formed over the AFC-SUL 204 (FIG. 2). According to an embodiment, a NiFeRu-based seed layer is formed over the AFC-SUL. According to a related embodiment, the NiFeRu-based seed layer formed at block 504 comprises a NiFeRu-based seed layer comprising around 1-20 at % Ru. As discussed and as presented in Table 1, a NiFeRu-based alloy having a range up to 35 at % Ru is deemed producible, however, a range considered practical yet effective in a high-volume production environment is approximately 1-20 at % Ru.

According to an embodiment, the NiFeX-based seed layer formed at block 504 comprises a magnetic $(NiFe)_{100-x}(X)_x$ alloy with X being selected from a group consisting of Ruthenium (Ru), Osmium (Os), Platinum (Pt), Rhenium (Re), Rhodium (Rh), Technetium (Tc), Iridium (Ir), and Cobalt (Co). According to a related embodiment, the NiFeX-based seed layer formed at block 504 comprises a magnetic $(NiFe)_{100-x}(X)_x$ alloy with X being selected from a group consisting of Ruthenium (x=0-35 at %), Osmium (x=0-10 at %), Platinum (x=0-30 at %), Rhenium (x=0-15 at %), Rhodium (x=0-40 at %), Technetium (x=0-30 at %), Iridium (x=0-15 at %), and Cobalt (x=0-60 at %).

At block 506, at least one magnetic recording layer is formed over the NiFeX-based magnetic seed layer. For example, a magnetic recording layer 208 (FIG. 2) stack is formed over the NiFeX-based seed layer 206 (FIG. 2).

The deposition of the various layers referenced in FIG. 5 can be performed using a variety of deposition sub-processes, for non-limiting examples, physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). Furthermore, other suitable deposition techniques known in the art may also be used.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A recording medium comprising:
   a substrate;
   at least one soft magnetic underlayer;
   a NiWAlFeX-based magnetic seed layer over said soft magnetic underlayer; and
   at least one magnetic recording layer over said NiWAlFeX-based magnetic seed layer;
   wherein X comprises an element that is soluble in Ni and has a higher melting point than Ni and is from a group consisting of osmium (Os), platinum (Pt), rhenium (Re), rhodium (Rh), technetium (Tc), and iridium (Ir).

2. The recording medium of claim 1, wherein X comprises an element from a group consisting of osmium (1-10 at %), platinum (1-30 at %), rhenium (1-15 at %), rhodium (1-40 at %), technetium (1-30 at %), and iridium (1-15 at %).

3. The recording medium of claim 1, wherein said NiWAlFeX-based magnetic seed layer is formed in direct contact with said soft magnetic underlayer.

4. The recording medium of claim 1, wherein said soft magnetic underlayer is an antiferromagnetically exchange coupled soft magnetic underlayer laminate.

5. The recording medium of claim 1, wherein X is selected such that NiX has a lower diffusion coefficient in WAlFe than the diffusion coefficient of Ni in WAlFe.

6. The recording medium of claim 1, wherein said magnetic recording layer comprises smaller magnetic grains than would a magnetic recording layer grown on a NiFe-based seed layer not comprising X.

7. The recording medium of claim 1, wherein said magnetic recording layer comprises magnetic grains more uniform in size than would a magnetic recording layer grown on a NiFe-based seed layer not comprising X.

8. The recording medium of claim 1, wherein said magnetic recording layer comprises more uniform magnetic grain segregation than would a magnetic recording layer grown on a NiFe-based seed layer not comprising X.

9. A data storage device comprising:
   a magnetic recording disk medium rotatably mounted on a spindle, said disk medium comprising:
      a substrate,
      at least one soft magnetic underlayer,
      a NiWAlFeX-based magnetic seed layer over said soft magnetic underlayer, and
      at least one magnetic recording layer over said NiWAlFeX-based magnetic seed layer,
      wherein X comprises an element that is soluble in Ni and has a higher melting point than Ni and is from a group consisting of osmium (Os), platinum (Pt), rhenium (Re), rhodium (Rh), technetium (Tc), and iridium (Ir);
   a head slider comprising a magnetic write head configured to write to said disk medium; and
   a voice coil motor configured to move said head slider to access portions of said disk medium.

10. The data storage device of claim 9, wherein X comprises an element from a group consisting of osmium (1-10 at %), platinum (1-30 at %), rhenium (1-15 at %), rhodium (1-40 at %), technetium (1-30 at %), and iridium (1-15 at %).

11. The data storage device of claim 9, wherein X is selected such that NiX has a lower diffusion coefficient in WalFe than the diffusion coefficient of Ni in WAlFe.

12. The data storage device of claim 9, wherein said magnetic recording layer of said disk medium comprises smaller magnetic grains than would a magnetic recording layer grown on a NiFe-based seed layer not comprising X.

13. The data storage device of claim 9, wherein said magnetic recording layer of said disk medium comprises magnetic grains more uniform in size than would a magnetic recording layer grown on a NiFe-based seed layer not comprising X.

14. The data storage device of claim 9, wherein said magnetic recording layer of said disk medium comprises more uniform magnetic grain segregation than would a magnetic recording layer grown on a NiFe-based seed layer not comprising X.

15. A method of manufacturing a recording medium, the method comprising:
   forming at least one antiferromagnetically exchange coupled magnetically soft underlayer laminate over a substrate;
   forming a NiWAlFeX-based magnetic seed layer over said at least one magnetically soft underlayer, wherein X comprises an element that has a higher melting point than Ni and is from a group consisting of osmium (Os), platinum (Pt), rhenium (Re), rhodium (Rh), technetium (Tc), and iridium (Ir); and
   forming at least one magnetic recording layer over said NiWAlFeX-based magnetic seed layer.

16. The method of claim 15, wherein forming said NiWAlFeX-based magnetic seed layer includes forming a NiWAlFeX-based magnetic seed layer wherein X comprises an element from a group consisting of osmium (1-10 at %), platinum (1-30 at %), rhenium (1-15 at %), rhodium (1-40 at %), technetium (1-30 at %), and iridium (1-15 at %).

17. A recording medium comprising:
   a substrate;
   at least one soft magnetic underlayer;
   a NiWAlFeRu-based magnetic seed layer over said soft magnetic underlayer and comprising 15-20 atomic percent (at %) Ru; and
   at least one magnetic recording layer over said NiWAlFeRu-based magnetic seed layer.

* * * * *